United States Patent
Sylvan

(10) Patent No.: US 9,243,815 B1
(45) Date of Patent: Jan. 26, 2016

(54) INFLATABLE METAL FOIL AND PTFE FILM SOLAR THERMAL PANEL WITH A TENSIONING SYSTEM

(71) Applicant: ZONBAK LLC, Needham, MA (US)

(72) Inventor: John E. Sylvan, Needham, MA (US)

(73) Assignee: Zonbak LLC, Needham, MA (US)

( * ) Notice: Subject to any disclaimer, the term of this patent is extended or adjusted under 35 U.S.C. 154(b) by 652 days.

(21) Appl. No.: 13/692,220

(22) Filed: Dec. 3, 2012

(51) Int. Cl.
*F24J 2/10* (2006.01)
*F24J 2/36* (2006.01)
*F24J 2/20* (2006.01)
*F24J 2/46* (2006.01)

(52) U.S. Cl.
CPC .. *F24J 2/36* (2013.01); *F24J 2/208* (2013.01); *F24J 2/4641* (2013.01)

(58) Field of Classification Search
CPC ........ F16B 5/0692; F24J 2/465; F24J 2/4627; F24J 2/4609; F24J 2/506; F24J 2/5271; F24J 2/1052; F24J 2/1057; F24J 2/36; F24J 2/208; F24J 2/4641; Y10S 126/904; Y02E 10/40; Y02E 10/44; Y02E 10/47
See application file for complete search history.

(56) References Cited

U.S. PATENT DOCUMENTS

| | | | |
|---|---|---|---|
| 2,659,392 A | 9/1947 | Frenkel | |
| 2,984,599 A | 5/1961 | Edwards et al. | |
| 3,597,591 A | 8/1971 | Ven Derlip | |
| 3,875,925 A | 4/1975 | Johnston | |
| 3,908,631 A | 9/1975 | Rom | |
| 4,003,367 A | 1/1977 | Wikholm | |
| 4,019,494 A | 4/1977 | Safdari | |
| 4,036,209 A | 7/1977 | Press | |
| 4,051,834 A | 10/1977 | Fletcher et al. | |
| 4,133,914 A | 1/1979 | Zani | |
| 4,159,709 A | 7/1979 | Palazzetti | |
| 4,160,443 A | 7/1979 | Brindle et al. | |
| 4,182,307 A | 1/1980 | Brindle et al. | |
| 4,191,169 A | 3/1980 | Hyman | |
| 4,203,425 A | 5/1980 | Clark | |
| 4,219,012 A | 8/1980 | Bergen | |
| 4,233,963 A | 11/1980 | Werner | |
| 4,237,863 A | 12/1980 | Harrison | |
| 4,257,396 A | 3/1981 | Reinert | |
| 4,458,673 A | 7/1984 | Benjamin | |
| 4,473,064 A | 9/1984 | Jacques | |
| 4,485,804 A | 12/1984 | Sharpe | |
| 4,495,936 A | 1/1985 | Frommhold | |
| 4,807,591 A | 2/1989 | Stranicky | |
| 5,388,567 A | 2/1995 | Hodak | |
| 5,397,408 A | 3/1995 | Guzik et al. | |
| 6,450,393 B1 | 9/2002 | Doumanidis et al. | |
| 8,049,120 B2 | 11/2011 | Prest et al. | |
| 8,191,547 B2 | 6/2012 | Pellegrino | |
| 8,191,757 B2 | 6/2012 | Lewis et al. | |
| 2011/0297299 A1 | 12/2011 | Lippy et al. | |

*Primary Examiner* — Alfred Basichas
(74) *Attorney, Agent, or Firm* — Hamilton, Brook, Smith & Reynolds, P.C.

(57) ABSTRACT

A low profile flexible solar thermal panel comprises low-cost, thin sheet foil and film materials fabricated as an integrated airtight solar thermal panel. An airtight seal provided by seam welding optically clear film between two or more metal foils, combined with the ability to inflate the panel via positive air pressure and deflate the panel with an automatic tensioning, permits the panel to change its height between two profiles.

17 Claims, 10 Drawing Sheets

INFLATABLE METAL FOIL AND PTFE FILM SOLAR THERMAL PANEL WITH A TENSIONING SYSTEM

FIELD OF THE INVENTION

This invention relates to the field of heat generation based on a solar thermal panel. In this context solar thermal is the ability to extract energy from solar radiation via a solar absorber. The heat can then be used for space heating or other uses such as hot-water generation or solar air conditioning.

BACKGROUND OF THE INVENTION

Solar thermal panels can capture solar radiation in the form of heat. An absorber, typically a metal plate or foil coated with a specialized solar absorber or black paint, converts the solar radiation into heat via the process of solar adsorption. The heat can be used directly for space heating, hot water generation, or solar air conditioning. With solar thermal panels, as with any other solar power generation, one of the key determinates of the total output power is the area of the solar panel in terms of square feet or square meters. Typically, the maximum output power is approximately 100 Watts/$F^2$. The larger the panel, the more solar radiation it captures and converts to heat. A 10 $F^2$ panel will generate 100 times the output power of a 1 $F^2$ panel.

Because a solar thermal panel requires both an air gap between glazing and absorber and an air gap between the absorber and insulation, solar thermal panels have used rigid solar glass and a rigid metal support structure to provide these air gaps. As a result, a large solar thermal panel with glass glazing soon weighs too much for economical fabrication, shipping, and installation. Because of weight and size limitations of rigid glass and frame, the largest practical solar thermal panels have been less than 32 square feet and have weighed several hundred pounds at that size. Even with flexible PTFE glazing (U.S. Pat. No. 4,191,169) the panel's rigid frame is heavy and limited in length, restricting panel length to just a few feet. With flexible glazing and an airtight, inflatable design, solar thermal panels can be many times the size at a fraction the weight and cost. A 96 $F^2$ solar thermal panel built with flexible films and foils can weigh less than 100 pounds. Furthermore, by combining high performance materials and manufacturing techniques, a flexible solar thermal panel can equal or surpass the performance of a rigid solar thermal panel. Just a few of these large flexible panels can provide much of the heat required in a residential home for space heating and hot water generation.

There has been the development of flexible solar thermal panels (U.S. Pat. No. 8,191,547 B2; U.S. Pat. No. 4,160,443; U.S. Pat. No. 4,036,209; U.S. Pat. No. 3,908,631) but they have been fabricated using low temperature plastics that employ plastic-to-plastic welding techniques to develop an airtight housing: the outside envelope of the panel is all plastic film. Typically they do not use a high-performance metal absorber because the high temperatures generated would exceed the softening temperature of most plastic films except PTFE. High temperature plastics such as PTFE could be used to provide higher operating temperatures, but because of PTFE's high expense per square foot it would be inefficient and costly to manufacture a solar thermal panel with an entire external PTFE envelope. Furthermore, direct roof mounting on a surface such as asphalt shingles will cause failures in an inflatable panel made solely of plastic films due to the abrasive nature of shingles and the inability of most plastics to withstand long-term abrasion. Minimum installation lifetimes for solar panels should be on the order of 25 years so abrasion is a key failure mechanism. Furthermore, because they are not made from high adsorption metal foils or high optical clarity plastic PTFE films, inflatable solar thermal panel efficiency has been rather low, and does not equal the performance (heat output) of rigid solar thermal panels fabricated from metal and glass.

Another issue with inflatable solar thermal panels is wind resistance. The best location to install a solar panel is on a roof oriented toward the southern horizon (in the Northern hemisphere). A roof installation, however, must be able to withstand wind velocities up to 100 mph in hurricane conditions. To withstand these conditions, a panel should have a minimum profile (vertical height), the ability to be firmly anchored to a roof, and a design that eliminates wind ingress below the panel. The flexible solar panels in prior art do not meet these requirements. In summary, although less expensive to manufacture, inflatable or flexible solar thermal panels have not matched the specifications of rigid solar thermal panels in terms of output power (solar efficiency) or wind resistance.

The use of thin flexible materials permits the fabrication of a solar thermal panel from "roll stock". Roll stock are thin materials that can be fabricated and then rolled onto a core and shipped in that fashion. Thin aluminum foils and PTFE film glazing are manufactured as a roll material cut to a specified width with hundreds or thousands of feet spooled onto a single roll. Because they are roll stock, they lend themselves to high-volume, high-speed manufacturing processes with highly automated roll stock machinery. In addition, the final product in a roll stock process can also be a roll stock, permitting the fabrication of long solar thermal panels that can be shipped in a "rolled up format", much like a carpet. The long, airtight solar thermal panel can then "rolled out" and be attached to a series of shorter fixed length support members or wire cable harness at the installation site. Solar panels manufactured as rolls, permit the installation of solar thermal panels in excess of 30 feet or more in length and maximum output power of 7 kilowatts or 24,000 BTUs (British Thermal Units).

SUMMARY OF THE INVENTION

The present invention provides a means to fabricate very thin and lightweight solar thermal panel. The output power (solar efficiency) matches that of expensive rigid solar panels. In place of a rigid glazing of either glass or rigid plastic, the invention employs thin, flexible Polytetrafluoroethylene (PTFE) film as glazing, aluminum or copper foils, and a flexible ceramic paper insulator. The PTFE film has 95% opacity to solar radiation and the capacity to operate at temperatures in excess of 300° F. Beneath the PTFE glazing is a solar absorber comprising a selective solar coating applied to aluminum or copper foil substrate that converts incident solar radiation that passes through glazing directly to heat. Because of the high heat generated by the solar absorber foil, the panel requires insulation to prevent excess heat build up at the back exterior surface of the panel from damaging the surface below the panel, typically asphalt shingles or rubber roof membrane, To provide this insulation, beneath the absorber is a thin flexible insulator made of a ceramic fiber paper or other flexible insulating material. Although less than ⅛" in thickness, the ceramic fiber blocks most of the heat transfer from inside the panel to outside back surface of the panel. For health reasons, the ceramic filter paper cannot be exposed to air that may flow through heat ducts in a structure and breathed by the structure's inhabitants. A metal foil layer between the ceramic paper insulator and the absorber foil layer isolates the ceramic fiber from the airflow through the panel. Because the ceramic paper insulation can absorb moisture and suffer damage due to abrasion, the panel incorporates a metal foil as the back surface of the panel. The foil layer can be as thin as 0.005".

The components of the flexible solar thermal panel of this invention comprise a combination of metal foils, PTFE film, and a thin ceramic oxide paper insulator. At a minimum there are 6 different layers of films or foils that must be joined together. One of the major objectives of the invention is to create an airtight and mechanically strong seal around the entire periphery of the solar thermal panel. It is impossible to reliably join ceramic paper to aluminum and aluminum to a PTFE film in an airtight seal without the use of adhesives or high-temperature slow bonding processes. The preferred embodiment overcomes this obstacle by incorporating an additional aluminum foil layer above the PTFE glazing and a design that captures, but does not seal, the ceramic fiber inside the panel's envelope. With ultrasonic welding techniques metal foil layers can easily be welded together at high speeds. With the PTFE film sandwiched between two metal foil layers and ultrasonically welded with the correct pressures, weld times, and seal head knurl pattern, the PTFE film can be captured in a strong and airtight mechanical seal between the top metal foil layer and the absorber top metal surface. The top foil layer is approximately 2" wide around the entire periphery of the panel so the absorber surface is exposed to sunlight. The welding process and design also captures the insulation layer between two metal foil layers; the foil layer above the insulator operates as the bottom of the air-flow channel, and the bottom foil layer protects the panel from weather as well as abrasion. The resulting panel is an integrated, airtight solar thermal panel less than ¼" in height with the ability to be manufactured in any length that can be rolled up for shipping and installation.

The most common place to install a solar thermal panel is on a roof. Because a roof is subject to high winds, a solar thermal panel requires a method to firmly attach the panel to the roof. In addition, the lower the panel's height or profile, the less likely it is to suffer damage to high winds. The inflatable solar panels described by U.S. Pat. No. 4,182,307, U.S. Pat. No. 4,160,443 & U.S. Pat. No. 8,191,547 and other prior art would not be suitable for roof mounting. They would suffer damage if exposed to high winds. The preferred embodiment of the described invention combines a low profile, ability to inflate during use, and then return to its original height. When in operation or ON, it expands to only 2" in height. When turned OFF, it will return to its original height of ¼". To provide for the ability of the flexible thermal panel to inflate and return to it's original state, the solar thermal panel employs a simple spring mechanism along the vertical edges of the solar thermal panel. When air flows under pressure to the panel, the spring-mounted mechanism permits the panel to inflate. When positive airflow stops, eliminating the pressure, the spring mechanism pulls the panel into a taut or flat state, with the overall thickness (or profile) determined by the total thickness of the individual materials. Punched holes along both horizontal edges of the panel provide the ability to attach spring-mounted clips to the panel, and then slide the panel into a low-profile extruded rail system. The rail system is firmly bolted to the roof or other mounting surface, and the spring clips slide into the rails. Because of the rails and solar thermal panel's low profile, the thermal panel is held taught directly against the roof surface so there is no wind ingress beneath the panel, reducing the possibility of damage or tearing off from the roof or other surface.

Heat transfer from the solar thermal panel to a structure occurs through a duct system and the use of forced air. An entry duct at one of the panel provides an ingress for forced air. An exit duct at the other end the panel provides the egress for the forced air that has been heated by solar radiation incident upon the metal foil absorber. When the air ingress and air egress ducts are different diameters, then the air duct channel layer will inflate due to the the back air pressure created by the difference in diameters and positive airflow. Also, if a small air passage exists between air duct channel and the gap between the absorber and glazing, then this layer will inflate as well due to the positive back air pressure. This provides for an insulating air layer between the absorber and glazing, eliminating direct heat conduction from absorber through glazing to the exterior of the panel. Maximum heat transfer according to Frankel (U.S. Pat. No. 2,659,392) occurs through an air duct that has a wide thin profile since more air is in contact with the heated back surface of the absorber. The preferred embodiment of this invention comprises an air channel 36" in width and 1" in height for a total airflow area of 36 inches square. The narrow channel is created by the combination of springs pulling in tension opposed by the air pressure generated by the air flow through the air duct channel.

BRIEF DESCRIPTION OF THE DRAWINGS

Other objects, features, and advantages will occur to those skilled in the art from the following description of the preferred embodiment and accompanying drawings in which.

DETAILED DESCRIPTION OF THE INVENTION

Although the present invention has been shown and described with respect to several preferred embodiments thereof, various changes, omissions and additions to the form and detail thereof, may be made therein, without departing from the spirit and scope of the invention.

Figure 1:
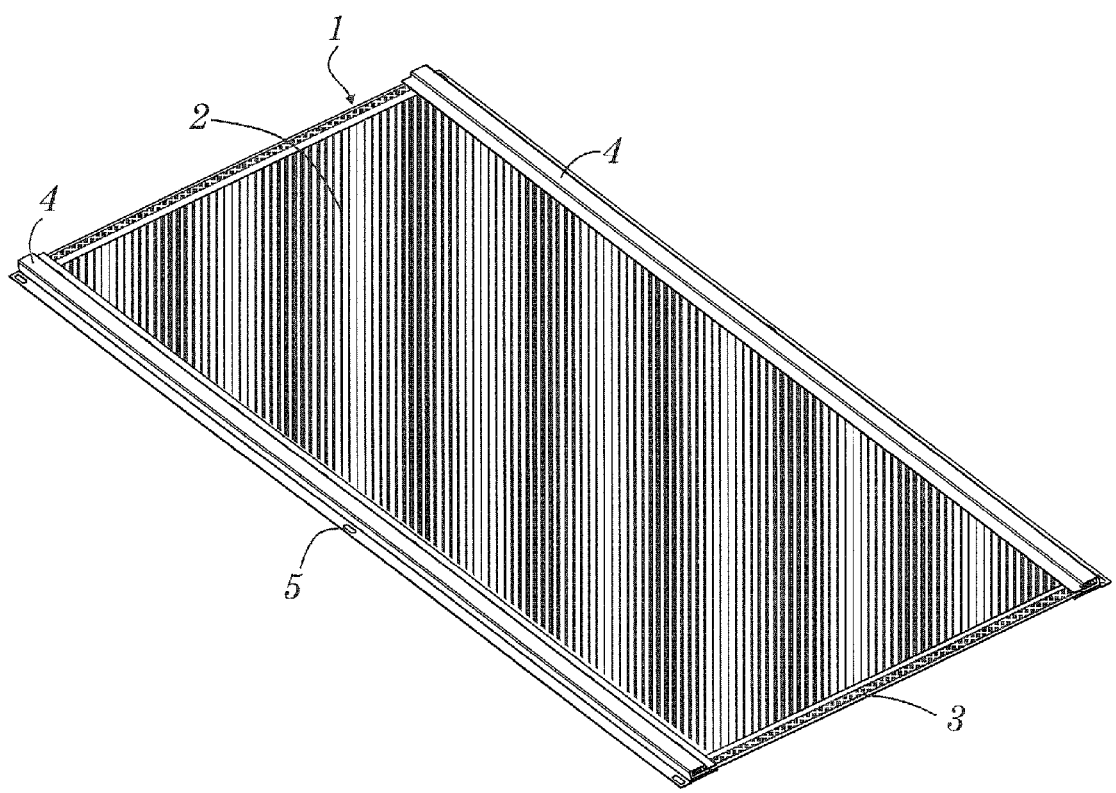
FIG. 1 is a general view of the flexible solar panel that comprises an inflatable solar thermal panel, mounting rails and hardware.

FIG. 1 is a top view of the flexible solar thermal panel. It comprises a panel 1 fabricated from metal foils, a optically clear film 2, and an insulation layer. The flexible solar thermal panel is sealed around its entire periphery via an ultrasonic or other sealing technique 3 that creates an airtight envelope for the entire panel 1. This flexible panel is then installed on a roof or other flat surface with two attachment rails 4. The rails anchor the solar thermal panel 1 to a roof or other flat surface via bolts or screws inserted through holes or slots 5. As illustrated, there are 3 slots per rail segment. The flexible panel 1 slides into the rails 4 via panel clips that incorporate a spring mechanism. This mechanism permits the panel 1 to expand when in operation, and then return to its flat state when not in operation. The total assembly including panel 1 and rails 4 have a vertical profile rails less than 1". To permit the installation of long flexible solar thermal panels, multiple attachment rails 4 can be installed in series. As an example, six attachment rails of 8' in length (three on each side of panel) can be installed end-to-end to attach a 24' long flexible thermal panel to a roof or other flat surface.

Figure 2A:
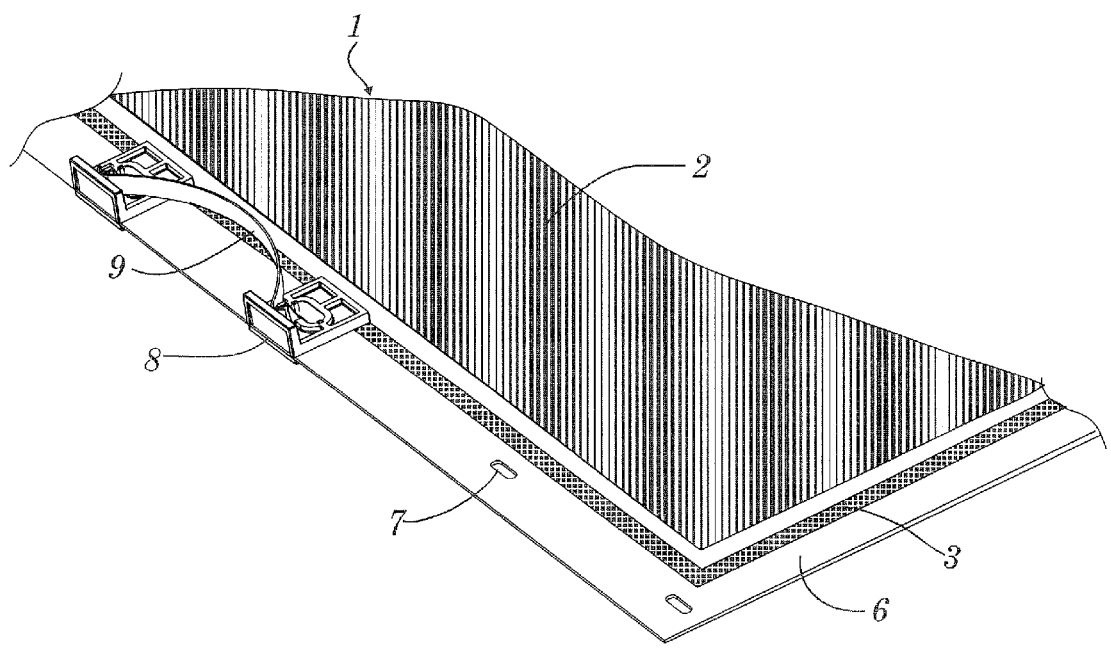
FIG. 2A is magnified view of one corner the flexible solar thermal and its method of attachment to the mounting rails.

FIG. 2A shows a magnified top view of one corner of the solar thermal panel 1. As illustrated, metal foil layer 6 extends approximately 2" in from the horizontal and vertical sides around the entire periphery of the panel. This dimension although preferred could be more or less and not affect the solar thermal panel's operation. The flexible optically clear film 2 comprises the rest of the panel's top surface. Around the entire periphery of the panel the seam weld 3 on metal foil 6 creates an airtight envelope for the entire panel 1. The seam weld 3, generated by ultrasonic or other metal welding techniques, mechanically bonds all the metal foil layers and flexible glazing of the panel together creating a uniformly strong and airtight seal along the entire seam 3. This seam weld 3 is located approximately ½" from all four outside edges and can vary in width from ⅛ to ½ inch. Also illustrated in FIG. 2A are the panel's mounting holes 7. Along the vertical edge there are a series of evenly punched holes 7 that run the length of the entire panel. The holes can be square, elliptical, or round. These holes will attach the solar thermal panel 1 to the mounting rails via mounting clips 8. Between the mounting clips 8 are flat form springs 9.

Figure 2B:
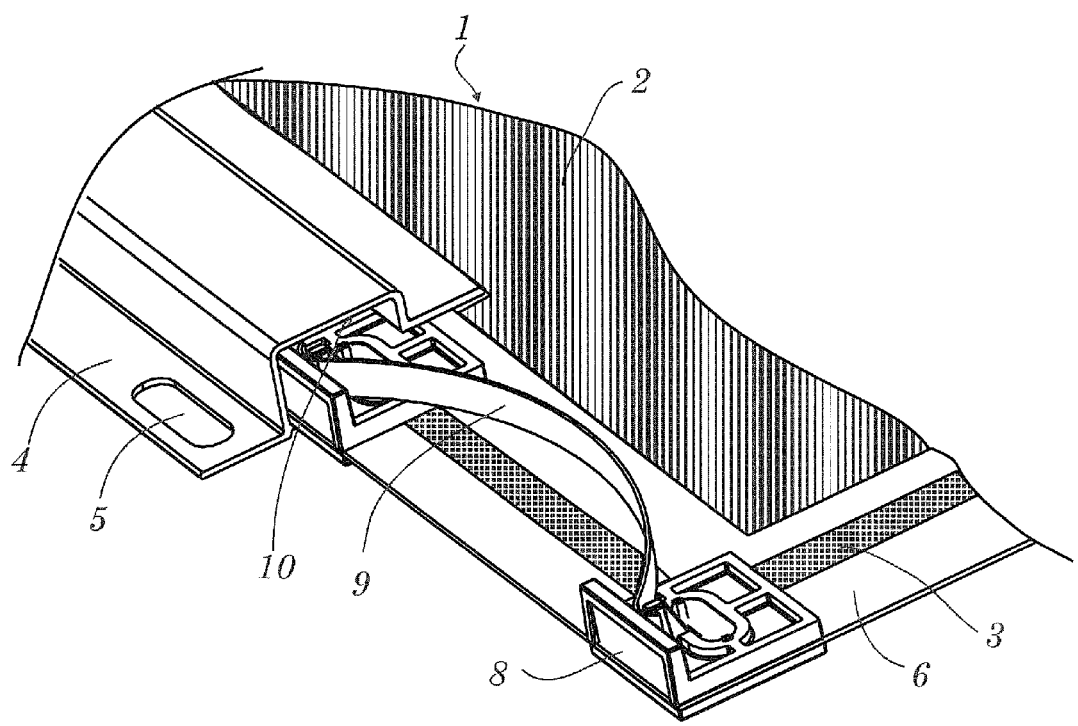
FIG. 2B is another magnified view of one corner of the flexible solar thermal panel with mounting hardware sliding into attachment rail

In FIG. 2B solar thermal panel 1 is shown being installed into the mounting railings 4. There is one rail for each vertical side of the panel 1. The extruded rails, or rails fashioned from another fabrication technique, mount to a flat surface such as a roof via screws or bolts inserted through slot 5. When installed, the horizontal distance from the slot centers 5 from the left and right rails 4 will be a specified dimension. This dimension is set to provide a compression force on flat form bow spring 9 in rail gap 10. When installed in the two vertical rails 4, the springs 9 on opposite sides of the panel will provide an opposing force to keep the flexible panel 1 taught. They will also permit the panel to inflate slightly when pressurized by a forced air flow. The embodiment illustrated in FIG. 2A and FIG. 2B is just one method to provide automatic tensioning to the panel. Other methods not diagramed but providing the same tensioning function could include the use of compression or extension springs in place of flat form bow springs 9, a pneumatic spring, an electromechanical tensioner, or a wire cable harness with spring tensioning.

Figure 3A:
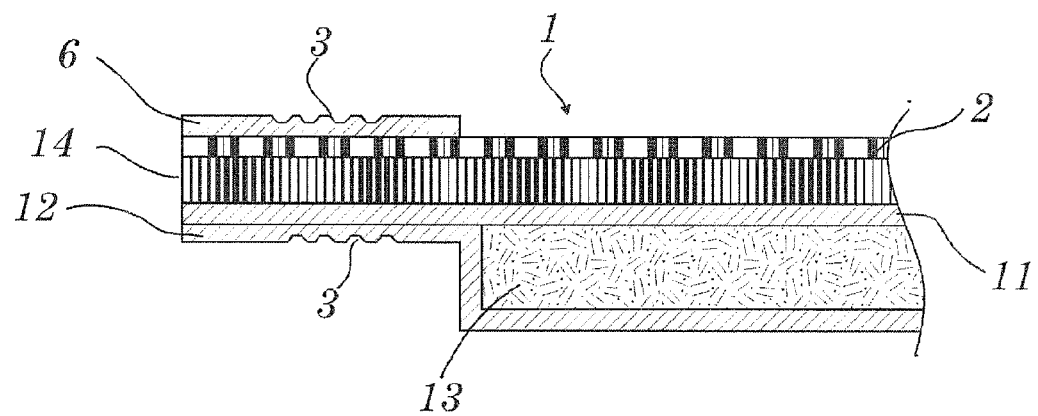
FIG. 3A is a cross section view of the flexible solar thermal panel showing the relative thickness and arrangement of the layers when the panel is in the OFF state and location of edge weld seal.

FIG. 3A shows a cross section view of the outside edge of the inflatable solar thermal panel 1 comprising six different layers of materials of different compositions and thickness. Layer 6 is a thin aluminum foil layer at the edge of the panel that provides a welding and sealing surface. This foil extends no more than 2" from the edge, but could extend more in another embodiments. The metal gage can be as little as 0.003". Layer 2 is a thin optically clear Teflon or other high temperature PTFE (Polytetrafluoroethylene) film that functions as glazing for the panel. This 95% optically clear layer permits solar radiation to pass through to absorber layer 14 and prevents infrared radiation from escaping, creating a greenhouse effect inside the panel 1. Layer 14 is a metal foil substrate of copper or aluminum coated with a selective solar material such as chromium dioxide. The selective solar material functions as a solar absorber converting solar radiation (sunlight) into heat. The foil layer 14 can also be aluminum or copper painted a black or other dark color, but it will not exhibit the same level of 95% solar absorption. Beneath layer 14 is another aluminum foil layer 11 that provides air isolation from the insulator in layer 13. In this embodiment, the insulation in layer 13 is a thin 0.125" mat of ceramic oxide or fiberglass that prevents heat loss out of the back of the panel through layer 12. It also prevents excessive heat from accumulating on the external surface of layer 12 which could cause damage to mounting surface 20 in FIG. 6. This insulation layer 13 does not go to the edge of the panel because it can not be welded into an airtight seam. Instead it is captured in place between layer 11 and layer 12 by the mechanical weld 3. Layer 12 is another thin aluminum foil from 0.003" to 0.007" in gage that provides wear and weather protection for the insulation in layer 13. Without the addition of aluminum foil layer 12, the insulation would absorb water and be damaged. It is also required to provide abrasion resistance for the insulation in layer 13 when the panel is installed on a roof or other abrasive surface. As shown in FIG. 3A, the panel is in the inactive or OFF state with no positive air pressure applied between layers 11 and 14. Consequently there are no air gaps and the panel is flat. The thickness of the panel is the sum of the individual thicknesses of all the layers illustrated in FIG. 3A. In the preferred embodiment this is typically less than ¼".

Figure 3B:
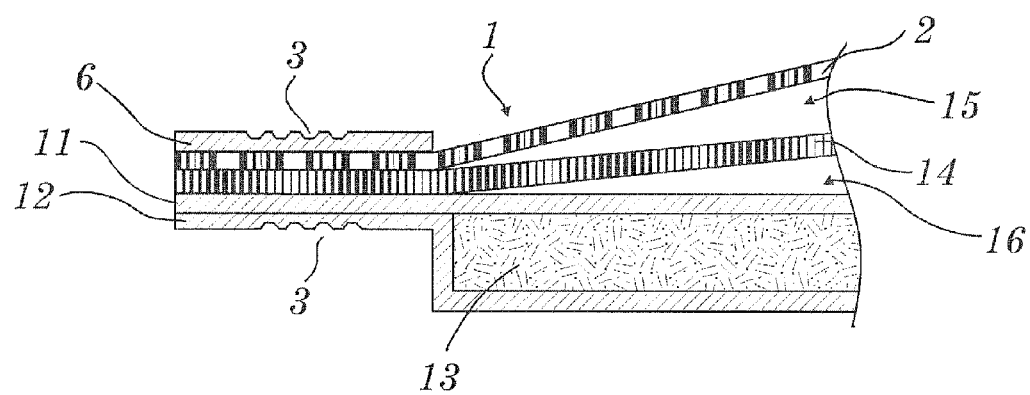
FIG. 3B is a cross section view of the flexible solar thermal panel in the ON state and shows the air channel beneath the solar absorber and the air gap between the solar absorber and the flexible film glazing.

FIG. 3B Shows a cross sectional diagram of the edge of the panel in the ON or active state. When forced air is introduced into the panel, two air gaps will be generated. Air gap 15 provides an air insulation layer between the glazing layer 2 and the heat absorber layer 14. This air gap eliminates direct conduction of heat from layer 2 to layer 14. Another air gap 16 is also created beneath the absorber foil 14 and the metal foil layer 11. This gap functions as an air duct, permitting forced air to travel the length of the panel and absorb heat from layer 14 in the process. Air gap 16 comprises surfaces of entirely of either aluminum or copper and is isolated from insulation layer 13 by layer 12. Direct contact of circulating air with the insulator in layer 13 could cause health issues due to the small fibers that could be picked up in the forced air flow. The welded seam 3 prevents any air from escaping out edges and permits the panel to be pressurized.

Figure 4A:
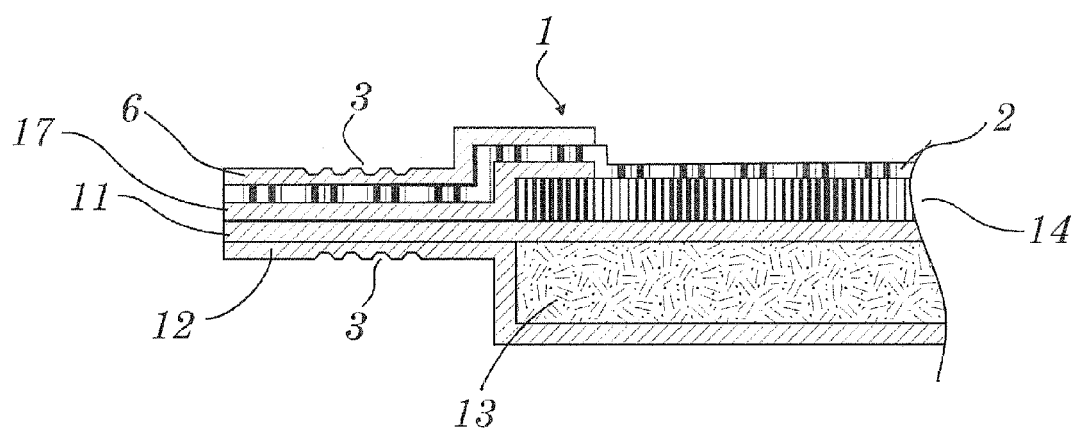
FIG. 4A is a cross section view of al alternative embodiment flexible solar thermal panel showing the relative thickness and arrangement of the layers when the panel is in the OFF or passive state. In this embodiment solar absorber foil is not captured in the edge weld seal.
Figure 4B:
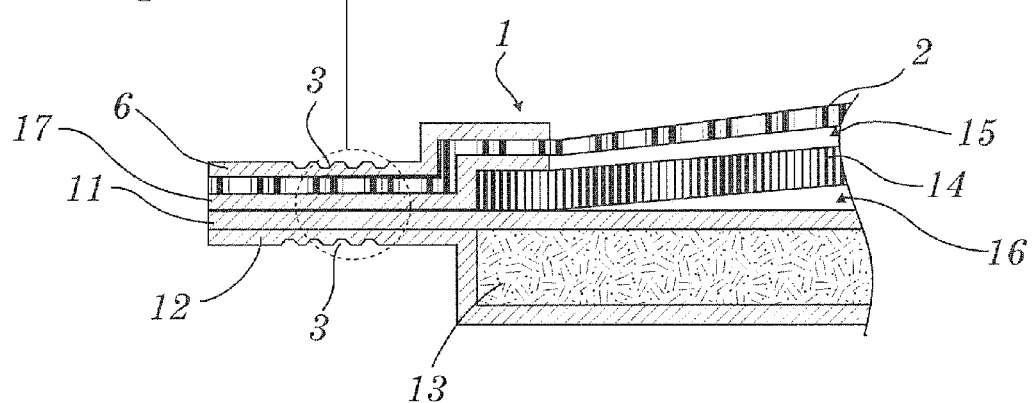
FIG. 4B is a cross section view of an alternative embodiment flexible solar thermal panel showing the relative thickness and arrangement of the layers when the panel is in the ON or active state. In this embodiment solar absorber foil is not captured in an edge weld seal.

An alternative embodiment of the invention is shown in FIGS. 4A and 4B. In this embodiment, the solar absorber 14 is not captured in the edge weld 3. It is free to move between layers 11 and 17, but is still contained within the airtight envelope created by welding layers 6, 2, 17, 11, and 12 and the tensioning system providing by rails 4 and springs 10. In this embodiment layer 17 is added to the panel 1 to provide a wear-reduction layer between the solar absorber layer 14 and the PTFE film glazing in layer 2. The solar absorber foil 14 will expand and contract based on changes in temperature which could cause undue wear in layer 2 and possible tearing, destroying the airtight envelope. With the ultrasonic weld 3, layers 11, 12 and 17 will weld together, and layer 17 will weld to layer 6 by creating microscopic perforations through the PTFE film of layer 2. The size of perforations is based on a knurl pattern edged into the ultrasonic weld head that creates the seal 3. This bond creates a strong mechanical bond, and also tightly captures the incompatible PTFE layer 2 in place in an airtight seal.

Under positive pressure as illustrated in FIG. 4B, air gap 15 and air gap 16 will be created as they were illustrated in FIG. 3B. As with FIG. 3B, air gap 15 will provide isolation between layer 2 and layer 14 and prevent direct conduction of heat. Air gap 16 will function as an air duct for the panel, permitting forced airflow to remove heat from the absorber 14. Because the solar absorber 14 and insulator in layer 13 in this embodiment are not captured in the edge seam weld 3, they can be easily removed for recycling or replacement if the entire panel is damaged.

Figure 4C:
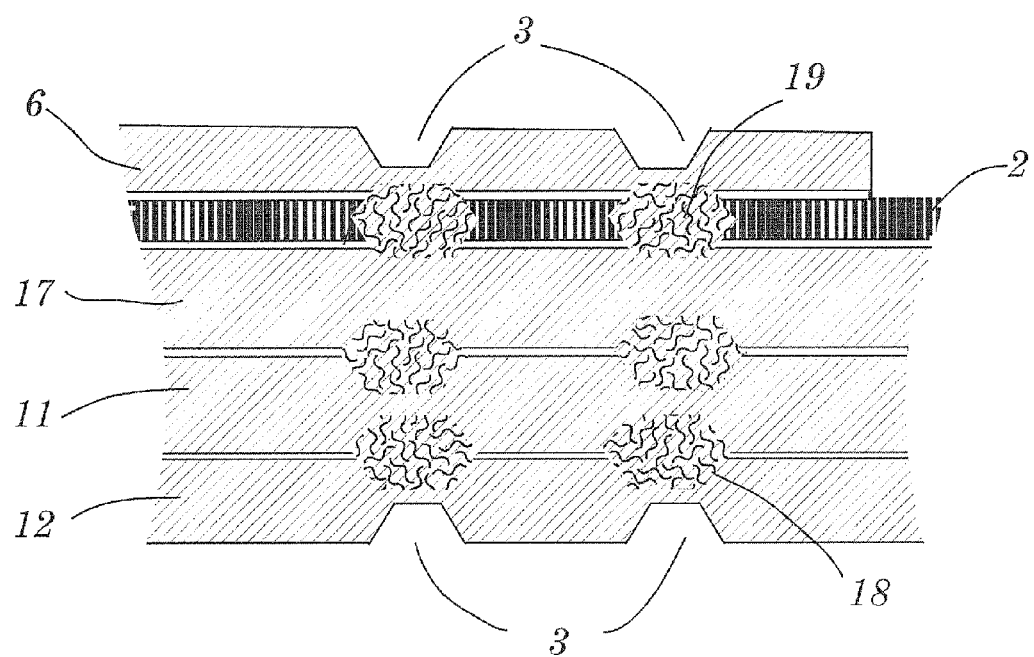
FIG. 4C is a magnified cross section view at edge weld 3 on FIG. 4B.

FIG. 4C illustrates a magnified view of the edge seal 3 in FIG. 4B. This edge seal provides an airtight uniform seal that is mechanically strong between all metal foil layers and captures the thin optically clear film in layer 2 in an airtight seal. In prior art, an airtight seal and panel envelope is accomplished by bonding or heat welding compatible plastic film layers (US 2011/0297299 A1, U.S. Pat. No. 8,191,547 B2, U.S. Pat. No. 5,388,567, U.S. Pat. No. 4,036,209). Materials of the same composition and melting temperatures are relatively easy to bond together via welding techniques. In the preferred embodiment of the invention, the edge seal is accomplished among incompatible materials; aluminum or copper foils and a heat-resistant plastic PTFE film. The capability of bonding metals to plastics via ultrasonic techniques has been discussed in prior art in Doumanidis et. al (U.S. Pat. No. 6,450,393) and Prest et. al. (U.S. Pat. No. 8,049,120). These were plastic to metal bonds with bonding surfaces of irregular contours. In the preferred embodiment of this invention, the bonds among are smooth surfaces, with the bond going between layers of metal films of compatible composition through a thin plastic material layer of incompatible composition. With an ultrasonic weld, metal layers 12, 11 and 17 will weld together easily since they are all metal-to-metal bonds. These bonds are shown as 18. Metal foil layer 17 will weld to metal foil layer 6 by creating microscopic perforations through layer 2 and forcing the deformed metal in layer 6 in direct contact with the metal in layer 17. The metal-to-metal contact then creates weld 19. The size of perforations is based on a knurl pattern edged into the ultrasonic weld head that creates the seal 3. This bond creates a strong mechanical bond, and also tightly captures the incompatible PTFE layer 2 in place in an airtight seal in a honeycomb or other similar pattern. The same process occurs in embodiment in FIG. 3A and FIG. 3B, but with the metal welds created between layers 12, 11, and 14. And the microperforation and then weld between layer 14 and layer 6.

Figure 5:
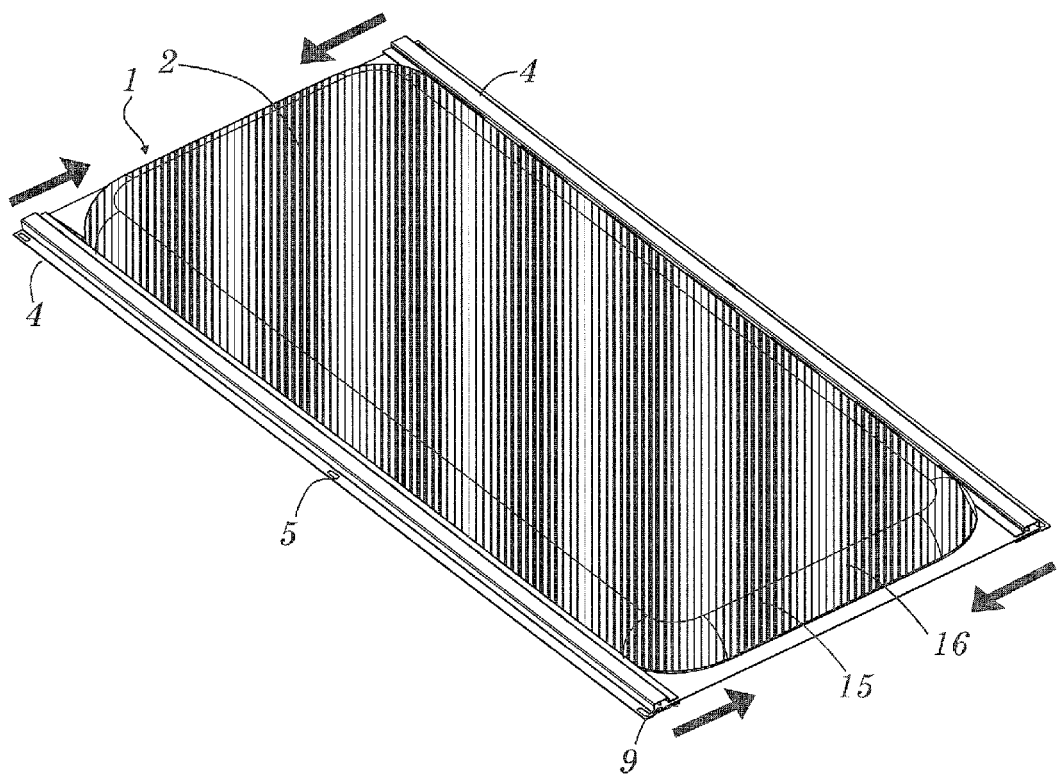
FIG. 5 is an illustration of the solar thermal panel in the inflated or ON state.

FIG. 5 shows the panel 1 in its inflated state. The top PTFE film layer 2 will bow out slightly under pressure, creating air gap 15 between the PTFE film 2 and absorber 14. The typical air gap is approximately 1", but will vary based on the air pressure. There will also be a second air gap 16 that will inflate between the absorber 14 and the foil layer 11. The panel 1 can expand because the springs 9 in the side rails 4 permit the vertical side of the panel to pull toward each other, permitting the panel to inflate. The same springs 9 will also pull the panel taught once the air pressure is removed from the panel. In this embodiment the panel will alternate between a height of approximately 2" when inflated and return to ¼" when deflated. These dimensions can vary in various embodiments of the invention and are only included to show relative changes in height.

Figure 6:
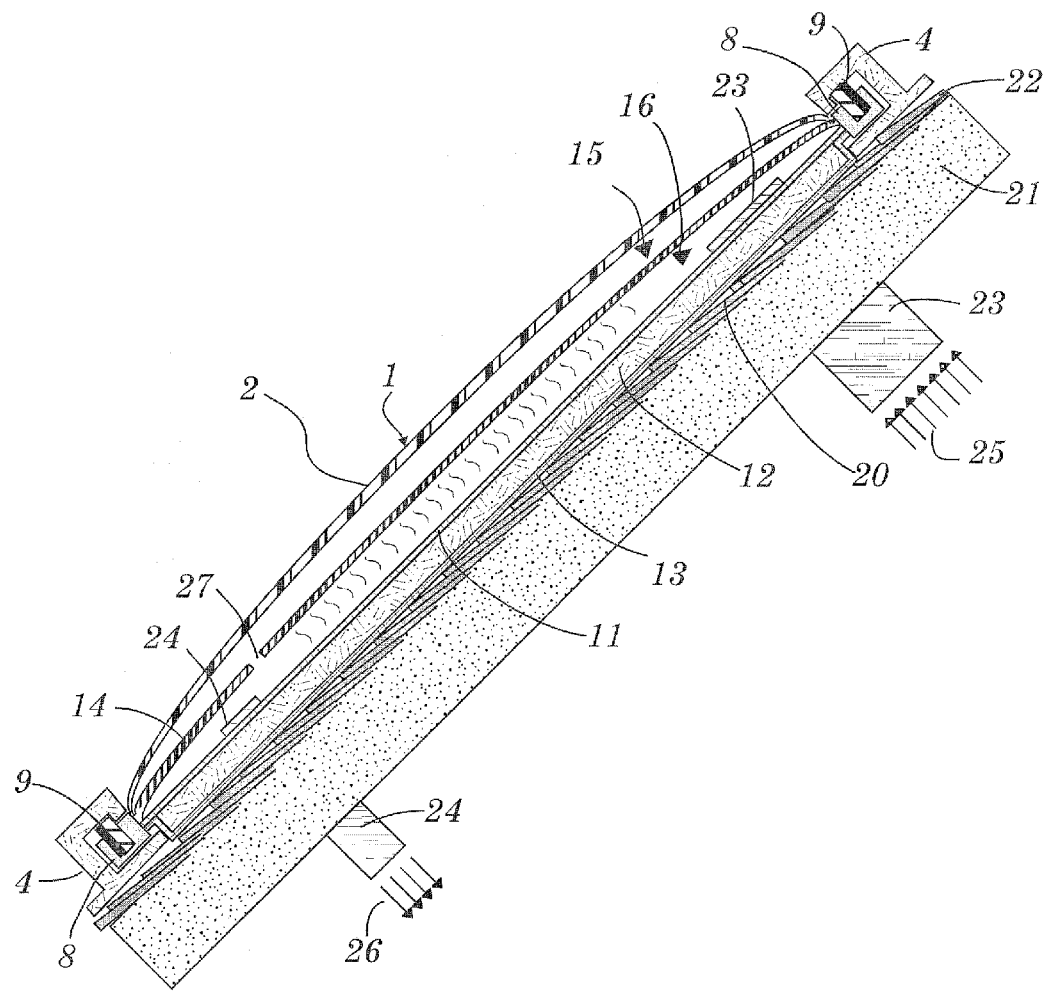
FIG. 6 Shows a cross section view the panel in the ON or active state mounted to a roof, exterior wall, or other flat surface.

FIG. 6 illustrates a cross section view of the panel installed on a sloped roof where 21 represents the roofing support member and 22 the roofing material. The vertical dimensions of panel 1 are not to scale and exaggerated for clarity. In the particular view the roof is sloped approximately 45 degrees and should have a southern orientation for best results. The orientation and slope, however, could be any value or direction. There is only a slight gap 20 between the back aluminum layer of the panel 13 and the roofing material 22, typically determined by the contour of the roofing material such as asphalt shingles. This minimizes the panels profile, eliminates wind ingress below panel, and provides insulation to the bottom layer 13 of panel 1 to minimize heat loss. The roofing material 22 and structural roof support 21 will provide additional insulation value. However, because of the small gap 20, the panel requires the insulation layer 12 to prevent excessive heat transfer from solar absorber 14 to roofing material 22. Without insulation 12, foil layer 13 could experience temperatures in excess of the maximum rated temperatures of many common roofing materials such as asphalt shingles or rubber roof membranes. In the summer months, the temperature can exceed 200° F. Forced air ducts 23 and 24 are installed through the roofing member 21, roofing 22 and terminate between layers 11 and 14. The inlet duct 23 has a diameter that is greater than the outlet duct 24. When supplied with forced air 25, the resulting back pressure will create air gap 16. This positive pressure will transfer through a small diameter hole 27 in absorber foil plate 14, creating air gap 15 between the absorber foil plate 14 and PTFE flexible glazing 2. The forced air 25 that flows into the panel travels the length of the panel from air duct 23 to air duct 24. As it makes the transit the absorber foil 14 will heat it from its ability to absorb solar radiation and convert it to heat and the hot air 26 will flow out air duct 24. On a clear day with a large amount of solar radiation available, the air temperature will increase approximately 100° F. as the air transits the panel. The air ducts are typically round and fabricated from galvanized steel, but could be any shape and any material that can withstand the 200° F. temperatures that airflow 24 can deliver. Once the airflow terminates, then springs 9 in the side rails 4 will pull the panel taught, returning it to its initial flat, low profile state.

What is claimed is:

1. A flexible solar thermal panel comprising:
   a flexible layer of optically transparent film forming a transparent top surface;
   a flexible insulator; and
   a flexible solar absorbing layer between the flexible layer of optically transparent film and the flexible insulator layer;
   the flexible solar thermal panel being sealed around its periphery with an airtight seal, the airtight seal forming a first inflatable region above the flexible solar absorbing layer and a second inflatable region below the flexible solar absorbing layer, the second inflatable region enabling an airflow therethrough from an inlet to an outlet to extract thermal heat from the flexible solar absorbing layer across a face of the flexible solar absorbing layer and inflate the first inflatable region.

2. The flexible solar thermal panel according to claim 1, further including:
   a top layer of metal foil along the periphery; and
   a bottom layer of metal foil, the airtight seal securing at least the flexible layer of optically transparent film between the bottom layer of metal foil and the top layer of metal foil with a metal-to-metal bond.

3. The flexible solar thermal panel according to claim 2, further including:
   a middle layer of metal foil between the flexible insulator layer and the flexible solar absorbing layer.

4. The flexible solar thermal panel of claim 2, further including:
   the airtight seal securing at least the flexible layer of optically transparent film and the flexible solar absorbing layer between the bottom layer of metal foil and the top layer of metal foil.

5. The flexible solar thermal panel of claim 4, the airflow inflating the first inflatable region, the first inflatable region insulating a top face of the flexible solar absorbing layer when inflated, and the airflow extracting thermal heat from a bottom face of the flexible solar absorbing layer.

6. The flexible solar thermal panel according to claim 2, wherein the metal-to-metal bond is an ultrasonic weld.

7. The flexible solar thermal panel according to claim 1, wherein the flexible solar thermal panel is attached to roof, wall, or other flat surface of a structure via an automatic tensioning system that permits expansion and contraction of the flexible solar thermal panel in response to the airflow.

8. The flexible solar thermal panel according to claim 1, wherein the flexible insulator layer comprises ceramic fiber paper.

9. The flexible solar thermal panel according to claim 1, wherein the flexible layer of optically transparent film comprises a flexible layer of PTFE film.

10. The flexible solar thermal panel according to claim 1, further including:
   a bottom layer of metal foil; and
   a middle layer of metal foil between the flexible insulator layer and the absorber layer, the bottom and middle layers of metal foil capturing the flexible insulator layer in an envelope therebetween and enabling the envelope to expand and contract about the flexible insulator layer.

11. The flexible solar thermal panel according to claim 1, wherein the adapted to be transported to installation site as a rolled up material.

12. The flexible solar thermal panel according to claim 1, wherein the flexible solar thermal panel is manufactured in multiple lengths and adapted to be installed by combining the panel with rigid guide rails of fixed length.

13. The flexible solar thermal panel according to claim 1, further including a series of mounting holes drilled or punched along two or more edges to permit installation of the flexible solar thermal panel in a rigid panel support structure via mounting hardware that incorporates a spring or other automatic tensioning system.

14. The flexible solar thermal panel of claim 1, wherein the flexible insulator is a solid flexible insulating layer.

15. The flexible solar thermal panel of claim 1, wherein inflation of the inflatable region causes the flexible solar thermal panel to contract.

16. A solar thermal heating system comprising:
   a flexible solar thermal panel comprising:
      a flexible layer of optically transparent film, the flexible layer of optically transparent film forming a transparent top surface,
      a flexible insulator layer, and
      a flexible solar absorbing layer between the flexible layer of optically transparent film and the flexible insulator layer,
      the flexible solar thermal panel being sealed around its periphery with an airtight seal, the airtight seal forming a first inflatable region above the flexible insulator layer and a second inflatable region below the flexible solar absorbing layer, the second inflatable region enabling an airflow therethrough from an inlet to an outlet to extract thermal heat from the flexible solar absorbing layer across a face of absorbing layer and to inflate the first inflatable region;
   two guide rails securing opposite sides of the flexible solar thermal panel;
   a tensioner adapted to tension the flexible solar thermal panel between the two guide rails;
   an air intake adapted to supply an airflow to the inlet of the flexible solar thermal panel; and
   a heat exhaust adapted to accept heated airflow from the outlet of the flexible solar thermal panel; and
   when the flexible solar thermal panel is exposed to solar energy, a supplied airflow: (i) flowing through the second inflatable region, (ii) inflating the first and second inflatable regions, (iii) contracting the flexible solar thermal panel between the two guide rails, and (iv) extracting heat from the face of the flexible solar absorbing layer.

17. A solar thermal heating system comprising:
   a flexible solar thermal panel manufactured from a roll-stock process, the flexible solar thermal panel comprising:
      a top layer of metal foil along the periphery,
      a flexible layer of transparent PTFE film, the flexible layer of transparent PTFE film forming a transparent top surface,
      a flexible insulator layer,
      a flexible solar absorbing layer between the flexible layer of transparent PTFE film and the flexible insulator layer,
      a bottom layer of metal foil, and
      the flexible solar thermal panel being sealed around its periphery with an airtight seal securing at least the flexible layer of transparent PTFE film between the bottom layer of metal foil and the top layer of metal foil with an ultrasonic weld, the airtight seal forming a first inflatable region above the flexible solar absorbing layer and a second inflatable region below the flexible solar absorbing layer, the second inflatable region enabling an airflow therethrough from an inlet to an outlet to extract thermal heat from across a bottom surface of the flexible solar absorbing layer;
   two guide rails securing opposite sides of the flexible solar thermal panel;
   a tensioner adapted to tension the flexible solar thermal panel between the two guide rails;
   when the flexible solar thermal panel is exposed to solar energy, a supplied airflow: (i) flowing through the second inflatable region, (ii) inflating the first and second inflatable regions, (iii) contracting the flexible solar thermal panel between the two guide rails, and (iv) extracting heat from the face of the flexible solar absorbing layer.

* * * * *